(12) United States Patent
Li et al.

(10) Patent No.: US 11,395,278 B2
(45) Date of Patent: Jul. 19, 2022

(54) RESOURCE CONFIGURATION METHOD AND APPARATUS TO PREVENT USER EQUIPMENT FROM REPLYING ACKNOWLEDGEMENT RESPONSE OF DIFFERENT DOWNLINK SUBFRAMES

(71) Applicant: HUAWEI TECHNOLOGIES CO., LTD., Guangdong (CN)

(72) Inventors: Junchao Li, Shanghai (CN); Zhengwei Gong, Shanghai (CN); Chi Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 326 days.

(21) Appl. No.: 16/459,144

(22) Filed: Jul. 1, 2019

(65) Prior Publication Data

US 2019/0327723 A1 Oct. 24, 2019

Related U.S. Application Data

(63) Continuation of application No. PCT/CN2018/071805, filed on Jan. 8, 2018.

(30) Foreign Application Priority Data

Jan. 6, 2017 (CN) .......................... 201710011441.5

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0055* (2013.01); *H04W 72/0446* (2013.01);
(Continued)

(58) Field of Classification Search
CPC ... H04L 1/1854; H04L 1/1861; H04L 1/1864; H04L 5/0055; H04L 5/0053;
(Continued)

(56) References Cited

U.S. PATENT DOCUMENTS

2009/0196204 A1 8/2009 Astely et al.
2010/0098005 A1* 4/2010 Lee .................... H04W 72/042
370/329
(Continued)

FOREIGN PATENT DOCUMENTS

CN 101179751 A 5/2008
CN 101389120 A 3/2009
(Continued)

OTHER PUBLICATIONS

3GPP TS 36.213 V11.1.0 (Dec. 2012),3rd Generation Partnership Project;Technical Specification Group Radio Access Network;Evolved Universal Terrestrial Radio Access (E-UTRA); Physical layer procedures(Release 11), total 160 pages.
(Continued)

*Primary Examiner* — Dung B Huynh
(74) *Attorney, Agent, or Firm* — Womble Bond Dickinson (US) LLP

(57) ABSTRACT

Embodiments of the present invention provide a resource configuration method and an apparatus, to prevent user equipment (UE) from replying acknowledgement responses of different downlink subframes. The method includes: receiving, by UE, configuration information of an acknowledgement response resource, where the acknowledgement response resource is used by the UE to send a downlink data channel acknowledgement response of an $n^{th}$ transmission unit on an uplink control channel of an $(n+k)^{th}$ transmission unit, the configuration information includes first information, the first information is used to indicate a quantity of
(Continued)

transmission units located before the n$^{th}$ transmission unit in a feedback window of the (n+k)$^{th}$ transmission unit; and sending, by the UE, the downlink data channel acknowledgement response of the n$^{th}$ transmission unit on the uplink control channel of the (n+k)$^{th}$ transmission unit based on the configuration information by using the acknowledgement response resource.

14 Claims, 7 Drawing Sheets

(51) Int. Cl.
H04W 80/08 (2009.01)
H04W 88/02 (2009.01)
(52) U.S. Cl.
CPC ....... *H04W 72/0453* (2013.01); *H04W 80/08* (2013.01); *H04W 88/02* (2013.01)
(58) Field of Classification Search
CPC .......... H04L 1/12–1896; H04W 72/04; H04W 72/042; H04W 72/0446; H04W 72/0453; H04W 72/12; H04W 80/08; H04W 88/02
See application file for complete search history.

(56) References Cited

U.S. PATENT DOCUMENTS

| | | | |
|---|---|---|---|
| 2010/0165939 A1* | 7/2010 | Lin | H04L 1/1854 370/329 |
| 2010/0195587 A1* | 8/2010 | Ratasuk | H04L 1/1614 370/329 |
| 2010/0208679 A1* | 8/2010 | Papasakellariou | H04L 5/0055 370/329 |
| 2011/0044278 A1 | 2/2011 | Astely et al. | |
| 2011/0243039 A1* | 10/2011 | Papasakellariou | H04L 5/0042 370/280 |
| 2011/0243066 A1* | 10/2011 | Nayeb Nazar | H04L 1/1671 370/328 |
| 2011/0261679 A1* | 10/2011 | Li | H04L 1/1854 370/216 |
| 2012/0044894 A1* | 2/2012 | Ko | H04L 1/0027 370/329 |
| 2012/0093040 A1* | 4/2012 | Wu | H04W 72/1268 370/279 |
| 2012/0113913 A1* | 5/2012 | Tiirola | H04L 1/1829 370/329 |
| 2012/0155413 A1* | 6/2012 | Liu | H04L 5/0055 370/329 |
| 2012/0176991 A1* | 7/2012 | Chen | H04L 1/1861 370/329 |
| 2012/0269103 A1* | 10/2012 | Papasakellariou | H04L 1/1621 370/280 |
| 2012/0307755 A1* | 12/2012 | Kim | H04L 1/1825 370/329 |
| 2012/0320846 A1* | 12/2012 | Papasakellariou | H04W 72/042 370/329 |
| 2013/0083751 A1* | 4/2013 | Papasakellariou | H04W 72/0406 370/329 |
| 2013/0121304 A1* | 5/2013 | Nory | H04B 7/04 370/330 |
| 2013/0128826 A1 | 5/2013 | Lin et al. | |
| 2013/0188589 A1 | 7/2013 | Nakashima et al. | |
| 2013/0194982 A1* | 8/2013 | Fwu | H04B 7/0413 370/280 |
| 2013/0223301 A1* | 8/2013 | Lee | H04W 72/042 370/281 |
| 2013/0242931 A1* | 9/2013 | Bi | H04L 1/1854 370/329 |
| 2013/0258914 A1* | 10/2013 | Seo | H04L 1/1861 370/280 |
| 2013/0301586 A1* | 11/2013 | Fan | H04L 1/1607 370/329 |
| 2013/0322357 A1* | 12/2013 | He | H04W 28/12 370/329 |
| 2013/0322358 A1* | 12/2013 | He | H04W 72/0406 370/329 |
| 2013/0322378 A1* | 12/2013 | Guan | H04W 72/1268 370/329 |
| 2013/0343238 A1* | 12/2013 | Seo | H04L 5/0053 370/280 |
| 2014/0036810 A1* | 2/2014 | Harrison | H04L 5/0094 370/329 |
| 2014/0036889 A1* | 2/2014 | Kim | H04L 5/001 370/336 |
| 2014/0064159 A1* | 3/2014 | Larsson | H04L 1/1607 370/280 |
| 2014/0071864 A1* | 3/2014 | Seo | H04L 5/0055 370/294 |
| 2014/0105155 A1* | 4/2014 | Kim | H04W 72/0413 370/329 |
| 2014/0105191 A1* | 4/2014 | Yang | H04L 1/1867 370/336 |
| 2014/0133452 A1* | 5/2014 | Nogami | H04L 5/0091 370/329 |
| 2014/0146720 A1* | 5/2014 | Tang | H04W 72/042 370/280 |
| 2014/0161001 A1* | 6/2014 | Gao | H04L 5/0055 370/280 |
| 2014/0301290 A1* | 10/2014 | He | H04W 72/1215 370/329 |
| 2015/0092693 A1* | 4/2015 | Fu | H04W 72/042 370/329 |
| 2015/0092757 A1* | 4/2015 | Tiirola | H04L 1/1861 370/336 |
| 2015/0156763 A1* | 6/2015 | Seo | H04L 5/1469 370/329 |
| 2015/0200761 A1* | 7/2015 | Kim | H04L 5/0057 370/280 |
| 2015/0237626 A1* | 8/2015 | Li | H04L 5/14 370/280 |
| 2015/0270916 A1* | 9/2015 | Oizumi | H04L 5/0055 370/280 |
| 2016/0044672 A1* | 2/2016 | Quan | H04L 5/0092 370/280 |
| 2016/0056940 A1* | 2/2016 | Chae | H04L 5/0055 370/312 |
| 2016/0182204 A1* | 6/2016 | Hsieh | H04L 1/1893 370/329 |
| 2016/0204924 A1* | 7/2016 | Li | H04L 5/0053 370/280 |
| 2016/0219577 A1* | 7/2016 | Yang | H04W 72/0413 |
| 2016/0226630 A1* | 8/2016 | Zhang | H04L 1/1861 |
| 2016/0277081 A1* | 9/2016 | Wei | H04B 7/0639 |
| 2016/0323071 A1* | 11/2016 | Berggren | H04W 72/0413 |
| 2016/0323076 A1* | 11/2016 | Takeda | H04L 5/0055 |
| 2017/0019237 A1* | 1/2017 | Yang | H04W 72/0446 |
| 2017/0041923 A1* | 2/2017 | Park | H04L 5/0053 |
| 2017/0054531 A1* | 2/2017 | Chae | H04W 72/0413 |
| 2017/0111886 A1* | 4/2017 | Kim | H04W 72/042 |
| 2017/0215188 A1* | 7/2017 | Kim | H04W 72/0446 |
| 2017/0230971 A1* | 8/2017 | Lee | H04W 72/042 |
| 2017/0310447 A1* | 10/2017 | Kusashima | H04W 72/04 |
| 2017/0373801 A1* | 12/2017 | Bergstrom | H04L 1/1896 |
| 2018/0042015 A1* | 2/2018 | Yin | H04L 1/1861 |
| 2018/0084457 A1* | 3/2018 | Lin | H04L 5/0055 |
| 2018/0092073 A1* | 3/2018 | Nogami | H04W 72/042 |
| 2018/0123744 A1* | 5/2018 | Nogami | H04L 5/0053 |
| 2018/0295220 A1* | 10/2018 | Ren | H04L 69/324 |
| 2018/0324841 A1* | 11/2018 | Horiuchi | H04W 72/12 |
| 2018/0338301 A1* | 11/2018 | Gao | H04L 1/1896 |
| 2018/0376504 A1* | 12/2018 | Si | H04L 1/16 |
| 2019/0014576 A1* | 1/2019 | Liao | H04L 5/0092 |
| 2019/0029052 A1* | 1/2019 | Yang | H04L 1/1861 |
| 2019/0140785 A1 | 5/2019 | Li et al. | |
| 2019/0140804 A1* | 5/2019 | Tang | H04L 1/1685 |
| 2019/0150170 A1* | 5/2019 | Park | H04W 74/08 370/329 |

(56) References Cited

U.S. PATENT DOCUMENTS

| | | | | |
|---|---|---|---|---|
| 2019/0173624 | A1* | 6/2019 | Liu | H04L 1/18 |
| 2019/0182821 | A1* | 6/2019 | You | H04B 7/0408 |
| 2019/0268929 | A1* | 8/2019 | Lee | H04L 5/00 |
| 2019/0281600 | A1 | 9/2019 | Fu et al. | |
| 2019/0363840 | A1* | 11/2019 | Wang | H04L 1/1822 |
| 2019/0364557 | A1* | 11/2019 | Harada | H04W 28/04 |
| 2020/0235866 | A1* | 7/2020 | Liu | H04L 5/0055 |
| 2020/0322101 | A1* | 10/2020 | Tang | H04W 72/04 |
| 2020/0328855 | A1* | 10/2020 | Stern-Berkowitz | H04L 1/1822 |
| 2020/0344737 | A1* | 10/2020 | Takeda | H04W 28/04 |
| 2020/0351867 | A1* | 11/2020 | Guo | H04L 1/0026 |
| 2021/0143943 | A1* | 5/2021 | Zhou | H04W 72/0493 |
| 2021/0185682 | A1* | 6/2021 | Lee | H04B 7/0632 |
| 2021/0298028 | A1* | 9/2021 | Matsumura | H04L 1/1854 |

FOREIGN PATENT DOCUMENTS

| | | |
|---|---|---|
| CN | 102014510 A | 4/2011 |
| CN | 102017504 A | 4/2011 |
| CN | 103582008 A | 2/2014 |
| CN | 104685816 A | 6/2015 |
| CN | 105308892 A | 2/2016 |
| WO | 2009134179 A1 | 11/2009 |

OTHER PUBLICATIONS

3GPP TS 36.213 V14.1.0 (Dec. 2016);3rd Generation Partnership Project;Technical Specification Group Radio Access Network;Evolved Universal Terrestrial Radio Access (E-UTRA);Physical layer procedures(Release 14);total 414 pages.

Qualcomm Incorporated,"Scaled Numerology Control Design for NR"3GPP TSG-RAN WG1 #86 R1-166363,Aug. 22-26, 2016,Gothenburg, Sweden,total 10 pages.

Samsung,"PUCCH resource allocation for TDD EPDCCH",3GPP TSG RAN WG1 #70bis R1-124384,San Diego, USA, Oct. 8-12, 2012,total 4 pages.

3GPP TSG RAN WG1 Meeting #86bis,R1-1610084,:"HARQ and scheduling operation for NR",NTT Docomo, Inc. Lisbon, Portugal Oct. 10-14, 2016,total 8 pages.

Ericsson: Details of ACK/NAK bundling for TDD, TSG-RAN WG1 #52bis, R1-081528, Shenzhen, China, Mar. 31-Apr. 4, 2008, total 4 pages XP50109942.

* cited by examiner (a)

(b)

RESOURCE CONFIGURATION METHOD AND APPARATUS TO PREVENT USER EQUIPMENT FROM REPLYING ACKNOWLEDGEMENT RESPONSE OF DIFFERENT DOWNLINK SUBFRAMES

CROSS-REFERENCE TO RELATED APPLICATIONS

This application is a continuation of International Application No. PCT/CN2018/071805, filed on Jan. 8, 2018, which claims priority to Chinese Patent Application No. 201710011441.5, filed on Jan. 6, 2017. The disclosures of the aforementioned applications are hereby incorporated by reference in their entireties.

TECHNICAL FIELD

Embodiments of the present invention relate to the field of communications technologies, and in particular, to a resource configuration method and an apparatus.

BACKGROUND

In a TDD (Time Division Duplexing) application scenario of an LTE (Long-Term Evolution) system, after a base station separately sends downlink data to different UEs (User Equipment) on PDSCHs (Physical Downlink Shared Channel) in a plurality of downlink subframes, the UEs may reply, in a same uplink subframe, to the base station with acknowledgement responses such as ACKs (Acknowledgement) or NACKs (Negative Acknowledgement) that are in a one-to-one correspondence with the plurality of downlink subframes.

For example, for a configuration in which an uplink-downlink configuration is 1 in TDD (that is, a ratio of a quantity of uplink subframes to a quantity of downlink subframes is 2:3), as shown in FIG. 1, an uplink subframe U7 may be used to reply to the base station with an acknowledgement response of downlink data sent on PDSCHs of downlink subframes D0 and D1. In this case, the two downlink subframes D0 and D1 form a HARQ (Hybrid Automatic Repeat reQuest) feedback window K of U7, where a size of the feedback window K is 2, and the feedback window K includes the two elements D0 and D1. In other words, in the TDD application scenario, a size of a feedback window of each uplink subframe and an element in the feedback window of the uplink subframe are preconfigured based on a different ratio of a quantity of uplink subframes to a quantity of downlink subframes.

In this case, to avoid using a same time-frequency resource to reply two acknowledgement responses respectively corresponding to D0 and D1 in U7, UE needs to calculate different resource offsets based on a quantity of CCEs (Control Channel Element) occupied by each symbol of a PDCCH (Physical Downlink Control Channel) in the two downlink subframes D0 and D1 in the feedback window, to determine different time-frequency resources occupied by the two acknowledgement responses.

However, in a D-TDD (Dynamic Time Division Duplex) application scenario in an NR (New Radio) system, a base station may flexibly configure, based on a service load status, each transmission unit as an uplink transmission unit or a downlink transmission unit (in the NR system, the transmission unit may be specifically a subframe, a slot, a mini-slot, an aggregated slot, or an aggregated mini-slot). In other words, a ratio of a quantity of uplink transmission units to a quantity of downlink transmission units is no longer fixed. In this case, for any uplink transmission unit (for example, U7), a size of a feedback window of the uplink transmission unit and an element in the feedback window are no longer fixed, either. In this case, the UE cannot determine a quantity of CCEs occupied by each symbol of a PDCCH in each downlink transmission unit in the feedback window. Consequently, the UE cannot determine a resource used when an acknowledgement response corresponding to a downlink subframe is replied in a same uplink transmission unit.

SUMMARY

Embodiments of the present invention provide a resource configuration method and an apparatus, to avoid a resource conflict caused because UE replies acknowledgement responses of different downlink subframes in a same uplink subframe by using a same resource in a D-TDD scenario.

To achieve the foregoing objective, the following technical solutions are used in the embodiments of the present invention:

According to a first aspect, an embodiment of the present invention provides a resource configuration method, including: receiving, by UE, configuration information that is of an acknowledgement response resource and that is sent by a base station, where the acknowledgement response resource is used by the UE to send a downlink data channel acknowledgement response of an $n^{th}$ transmission unit on an uplink control channel of an $(n+k)^{th}$ (k is an integer and n is an integer) transmission unit, the configuration information includes first information that is used to indicate a quantity of transmission units located before the $n^{th}$ transmission unit in a feedback window of the $(n+k)^{th}$ transmission unit, and the feedback window is a set of all transmission units for which a downlink data channel acknowledgement response needs to be sent on the uplink control channel of the $(n+k)^{th}$ transmission unit; and further, sending, by the UE, the downlink data channel acknowledgement response of the $n^{th}$ transmission unit on the uplink control channel of the $(n+k)^{th}$ transmission unit based on the configuration information by using the acknowledgement response resource.

In this way, for each transmission unit in the feedback window of the $(n+k)^{th}$ transmission unit, because a location of the transmission unit in the feedback window is fixed and unique, different transmission units in the feedback window correspond to different configuration information. Therefore, for each transmission unit in the feedback window, the UE may determine, according to the foregoing method, an acknowledgement response resource uniquely corresponding to the transmission unit on the uplink control channel of the $(n+k)^{th}$ transmission unit, and send an acknowledgement response by using the acknowledgement response resource, to avoid a resource conflict between different acknowledgement response resources when the UE uses the different acknowledgement response resources in a same transmission unit in a D-TDD scenario.

In this case, the acknowledgement response resource is determined by the UE based on the first information.

In one embodiment, the configuration information further includes second information, and the second information is used to indicate a size of the feedback window of the $(n+k)^{th}$ transmission unit.

In this case, the acknowledgement response resource is determined by the UE based on the first information and the second information.

In one embodiment, the acknowledgement response resource is mapped to the uplink control channel of the $(n+k)^{th}$ transmission unit first in ascending order of subcarrier indexes and then in descending order of symbol indexes. In this way, for an uplink control channel with short duration, because the uplink control channel is usually located on last one or two symbols of a slot, when an acknowledgement response resource is first mapped to a location of a time-frequency resource with a relatively large symbol index, time-frequency resource with a relatively small symbol index within the uplink control channel may still be used to transmit downlink data, so that PUCCH resources are flexibly configured, thereby reducing a waste of PUCCH resources.

In one embodiment, the receiving, by UE, configuration information of an acknowledgement response resource includes: receiving, by the UE by using physical layer signaling, broadcast signaling, or higher layer signaling, the configuration information that is of the acknowledgement response resource and that is sent by a base station.

According to a second aspect, an embodiment of the present invention provides a resource configuration method, including: sending, by UE, a downlink data channel acknowledgement response of an $n^{th}$ transmission unit on an uplink control channel of an $(n+k)^{th}$ transmission unit by using an acknowledgement response resource, where the acknowledgement response resource is determined by the UE based on resource location information, and the resource location information includes a first parameter and a second parameter, where the first parameter is used to indicate a time offset between a time at which the UE receives downlink control information DCI corresponding to downlink data of the $n^{th}$ transmission unit and a time at which the UE sends the downlink data channel acknowledgement response of the $n^{th}$ transmission unit; and the second parameter includes an index of a first physical resource block PRB used when the UE transmits the downlink data in the $n^{th}$ transmission unit, or an index of a first control channel element CCE used when the UE transmits the DCI.

The first parameter may be used to distinguish any two UEs from different PDCCHs, and the second parameter may be used to distinguish any two UEs from a same PDCCH. Therefore, for any two UEs, first parameters and/or second parameters respectively corresponding to the two UEs are usually different. Therefore, the UE can determine a uniquely corresponding PUCCH resource index based on the first parameter and/or the second parameter, to determine an acknowledgement response resource uniquely corresponding to the PUCCH resource index. In this way, a resource conflict between different acknowledgement response resources when the UE uses different acknowledgement response resources in a same transmission unit can be avoided.

In one embodiment, the resource location information further includes a third parameter, and the third parameter includes a number of an antenna port used when a base station sends the downlink data in the $n^{th}$ transmission unit, or a scrambled ID of a reference signal used when the UE receives the downlink data in the $n^{th}$ transmission unit.

In one embodiment, the resource location information further includes a fourth parameter, and the fourth parameter includes a number of an antenna port used when a base station sends the DCI, or a scrambled ID of a reference signal used when the UE receives the DCI.

According to a third aspect, an embodiment of the present invention provides a resource configuration method, including: sending, by a base station, configuration information of an acknowledgement response resource, where the acknowledgement response resource is used by UE to send a downlink data channel acknowledgement response of an $n^{th}$ transmission unit on an uplink control channel of an $(n+k)^{th}$ transmission unit, the configuration information includes first information, the first information is used to indicate a quantity of transmission units located before the $n^{th}$ transmission unit in a feedback window of the $(n+k)^{th}$ transmission unit, and the feedback window is a set of all transmission units for which a downlink data channel acknowledgement response needs to be sent on the uplink control channel of the $(n+k)^{th}$ transmission unit.

In one embodiment, the configuration information further includes second information, and the second information is used to indicate a size of the feedback window of the $(n+k)^{th}$ transmission unit.

According to a fourth aspect, an embodiment of the present invention provides UE, including: a receiving unit, configured to receive configuration information of an acknowledgement response resource, where the acknowledgement response resource is used by the UE to send a downlink data channel acknowledgement response of an $n^{th}$ transmission unit on an uplink control channel of an $(n+k)^{th}$ transmission unit, the configuration information includes first information, the first information is used to indicate a quantity of transmission units located before the $n^{th}$ transmission unit in a feedback window of the $(n+k)^{th}$ transmission unit, the feedback window is a set of all transmission units for which a downlink data channel acknowledgement response needs to be sent on the uplink control channel of the $(n+k)^{th}$ transmission unit, the $n^{th}$ transmission unit is one of all the transmission units, k is an integer, and n is an integer; and a sending unit, configured to send the downlink data channel acknowledgement response of the $n^{th}$ transmission unit on the uplink control channel of the $(n+k)^{th}$ transmission unit based on the configuration information by using the acknowledgement response resource.

In one embodiment, the UE further includes: a determining unit, configured to determine the acknowledgement response resource based on the first information.

In one embodiment, the configuration information further includes second information, and the second information is used to indicate a size of the feedback window of the $(n+k)^{th}$ transmission unit; and the determining unit is further configured to determine the acknowledgement response resource based on the first information and the second information.

In one embodiment, the UE further includes a mapping unit, configured to map the acknowledgement response resource to the uplink control channel of the $(n+k)^{th}$ transmission unit first in ascending order of subcarrier indexes and then in descending order of symbol indexes.

In one embodiment, the receiving unit is specifically configured to receive, by using physical layer signaling, broadcast signaling, or higher layer signaling, the configuration information that is of the acknowledgement response resource and that is sent by a base station.

According to a fifth aspect, an embodiment of the present invention provides UE, including: a determining unit, configured to determine, based on resource location information, an acknowledgement response resource used when the UE sends a downlink data channel acknowledgement response of an $n^{th}$ transmission unit on an uplink control channel of an $(n+k)^{th}$ transmission unit, k is an integer, and n is an integer; and a sending unit, configured to send the downlink data channel acknowledgement response of the $n^{th}$ transmission unit on the uplink control channel of the $(n+k)^{th}$ transmission unit by using the acknowledgement response resource, where the resource location information includes a first parameter and a second parameter; the first parameter is used to indicate a time offset between a time at which the UE receives downlink control information DCI corresponding to downlink data of the $n^{th}$ transmission unit and a time at which the UE sends the downlink data channel acknowledgement response of the $n^{th}$ transmission unit; and the second parameter includes an index of a first PRB used when the UE transmits the downlink data in the $n^{th}$ transmission unit, or an index of a first CCE used when the UE transmits the DCI.

According to a sixth aspect, an embodiment of the present invention provides a base station, including: a determining unit, configured to determine location information of an acknowledgement response resource, where the acknowledgement response resource is used by UE to send a downlink data channel acknowledgement response of an $n^{th}$ transmission unit on an uplink control channel of an $(n+k)^{th}$ transmission unit, the configuration information includes first information, the first information is used to indicate a quantity of transmission units located before the $n^{th}$ transmission unit in a feedback window of the $(n+k)^{th}$ transmission unit, the feedback window is a set of all transmission units for which a downlink data channel acknowledgement response needs to be sent on the uplink control channel of the $(n+k)^{th}$ transmission unit, the $n^{th}$ transmission unit is one of all the transmission units, k is an integer, and n is an integer; and a sending unit, configured to send the configuration information of the acknowledgement response resource to the UE.

According to a seventh aspect, an embodiment of the present invention provides UE, including a processor, a memory, a bus, and a communications interface, where the memory is configured to store a computer executable instruction, the processor is connected to the memory by using the bus, and when the UE operates, the processor executes the computer executable instruction stored in the memory, so that the UE performs the resource configuration method according to the first aspect, the second aspect, or any possible implementation of the first aspect or the second aspect.

According to an eighth aspect, an embodiment of the present invention provides a base station, including a processor, a memory, a bus, and a communications interface, where the memory is configured to store a computer executable instruction, the processor is connected to the memory by using the bus, and when the base station operates, the processor executes the computer executable instruction stored in the memory, so that the base station performs the resource configuration method according to the third aspect or any possible implementation of the third aspect.

According to a ninth aspect, an embodiment of the present invention provides a computer storage medium, configured to store a computer software instruction used by the foregoing UE, where the computer software instruction includes a program designed for the UE for performing the foregoing aspects.

According to a tenth aspect, an embodiment of the present invention provides a computer storage medium, configured to store a computer software instruction used by the foregoing base station, where the computer software instruction includes a program designed for the base station for performing the foregoing aspects.

According to an eleventh aspect, an embodiment of the present invention provides a computer program, where the computer program includes an instruction, and when the computer program is executed by a computer, the computer can perform the resource configuration method according to the first aspect or any possible implementation of the first aspect.

In the present invention, a name of UE or a base station does not constitute any limitation on a device. In actual implementation, these devices may be present with other names. The devices fall within the scope of the claims of the present invention and equivalent technologies of the present invention, provided that functions of the devices are similar to those in the present invention.

In addition, for technical effects of any design manner in the second aspect to the eleventh aspect, refer to technical effects of different design manners in the first aspect or the second aspect. Details are not described herein again.

These aspects or other aspects of the present invention are more concise and more comprehensive in descriptions of the following embodiments.

Further, an apparatus is provided.

In one embodiment, the apparatus includes one or more processors and a communications unit. The one or more processors are configured to support the apparatus in performing corresponding functions of a network device (such as a base station) in the foregoing methods. The communications unit is configured to support the apparatus in communicating with another device, to implement a receiving and/or sending function, for example, send configuration information of an acknowledgement response resource.

In one embodiment, the apparatus may further include one or more memories. The memory is coupled to the processor, and is configured to store a program instruction and/or data necessary to the network device. The one or more memories may be integrated with the processor, or may be disposed separate from the processor. This is not limited in this application.

The apparatus may be a base station, a gNB, or a TRP, or the like. The communications unit may be a transceiver or a transceiver circuit. Optionally, the transceiver may alternatively be an input/output circuit or interface.

The apparatus may alternatively be a communications chip. The communications unit may be an input/output circuit or interface of the communications chip.

In another embodiment, the apparatus includes a transceiver, a processor, and a memory. The processor is configured to control the transceiver to receive and send signals. The memory is configured to store a computer program. The processor is configured to execute the computer program in the memory, so that the apparatus performs the method completed by a network device (such as a base station) according to the third aspect or any possible implementation of the third aspect.

In one embodiment, the apparatus includes one or more processors and a communications unit. The one or more processors are configured to support the apparatus in performing corresponding functions of a terminal device (such as UE) in the foregoing methods. The communications unit is configured to support the apparatus in communicating with another device, to implement a receiving and/or sending function, for example, receive configuration information of an acknowledgement response resource.

In one embodiment, the apparatus may further include one or more memories. The memory is coupled to the processor, and is configured to store a program instruction and/or data necessary to the apparatus. The one or more memories may be integrated with the processor, or may be disposed separate from the processor. This is not limited in this application.

The apparatus may be an intelligent terminal, a wearable device, or the like. The communications unit may be a transceiver or a transceiver circuit. Optionally, the transceiver may alternatively be an input/output circuit or interface.

The apparatus may alternatively be a communications chip. The communications unit may be an input/output circuit or interface of the communications chip.

In another embodiment, the apparatus includes a transceiver, a processor, and a memory. The processor is configured to control the transceiver to receive and send signals. The memory is configured to store a computer program. The processor is configured to execute the computer program in the memory, so that the apparatus performs the method completed by a terminal device (such as UE) according to the first aspect, the second aspect, or any possible implementation of the first aspect or the second aspect.

According to a twelfth aspect, a system is provided, where the system includes the terminal device and the network device described above.

According to a thirteenth aspect, a computer program product is provided, where the computer program product includes computer program code; and when the computer program code runs on a computer, the computer performs the method according to any one of the first to the third aspects, or any possible implementation of the first to the third aspects.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention.

In addition, terms such as "first" and "second" are merely for a descriptive purpose, and cannot be understood as indicating or implying relative importance, or implicitly indicating a quantity of indicated technical features. Therefore, the features defined by "first" and "second" can explicitly or implicitly include one or more features. In the description of the present invention, "a plurality of" means two or more, unless otherwise stated.

In a 3GPP (3rd Generation Partnership Project) protocol, a size of a feedback window of each uplink subframe and an element in the feedback window of the uplink subframe are preconfigured for UE based on a different ratio of a quantity of uplink subframes to a quantity of downlink subframes.

Figure 1:
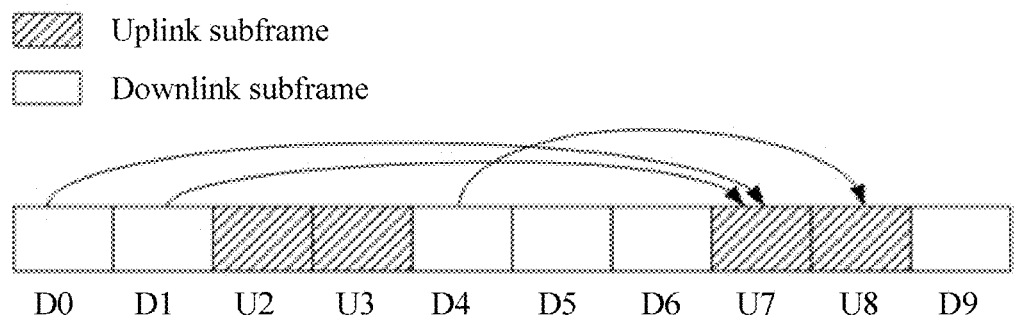
FIG. 1 is a schematic diagram of an application scenario in which a plurality of acknowledgement responses are replied in a same uplink subframe in the prior art.

Downlink data channel acknowledgement responses of different downlink subframes, for example, downlink data channel acknowledgement responses of a downlink subframe D0 and a downlink subframe D1 in FIG. 1, may be sent on an uplink control channel of a same uplink subframe, for example, an uplink control channel of an uplink subframe U7 in FIG. 1. In this case, a feedback window of the uplink subframe U7 includes the downlink subframe D0 and the downlink subframe D1.

Therefore, when these acknowledgement responses are sent on the uplink control channel of the uplink subframe U7, an acknowledgement response resource occupied by each acknowledgement response should be different; otherwise, conflicts occur between different acknowledgement response resources.

In this case, in a TDD scenario, the UE may calculate a PUCCH (Physical Uplink Control Channel, physical uplink control channel) resource index 1 of the downlink data channel acknowledgement response of D0 in U7 and a PUCCH resource index 2 of the downlink data channel acknowledgement response of D1 in U7 by using a quantity of CCEs occupied by each symbol of a PDCCH in each of the two downlink subframes D0 and D1 in the feedback window of the uplink subframe U7. Subsequently, the UE determines an acknowledgement response resource 1 of the downlink data channel acknowledgement response of D0 based on the PUCCH resource index 1, and determines an acknowledgement response resource 2 of the downlink data channel acknowledgement response of D1 based on the PUCCH resource index 2.

However, in a D-TDD scenario, because locations and quantities of uplink subframes and downlink subframes are no longer fixed, for any uplink subframe, a size of a feedback window of the uplink subframe and an element in the feedback window are no longer fixed. In other words, the feedback window of U7 may include D0 and D1, or may include D0, D1, and D4. In this case, because the UE cannot determine a specific downlink subframe in a feedback window of each uplink subframe, the UE cannot further determine a corresponding acknowledgement response resource by using a total quantity of CCEs occupied by each symbol of a PDCCH in each downlink subframe in the feedback window.

In this case, an embodiment of the present invention provides a resource configuration method. In the method, a base station may configure, for UE, acknowledgement response resources that are of different downlink subframes and that need to be replied in any uplink subframe, to avoid a resource conflict caused because the UE replies acknowledgement responses of different downlink subframes in a same uplink subframe by using a same acknowledgement response resource.

Specifically, the UE first receives configuration information that is of an acknowledgement response resource and that is sent by the base station, where the acknowledgement response resource is used by the UE to send a downlink data channel acknowledgement response of an $n^{th}$ transmission unit on an uplink control channel of an $(n+k)^{th}$ transmission unit, and n and k are both integers.

The configuration information includes first information that is used to indicate a quantity of transmission units located before the $n^{th}$ transmission unit in a feedback window of the $(n+k)^{th}$ transmission unit. For example, the $n^{th}$ transmission unit is a subframe 1, and the $(n+k)^{th}$ transmission unit is a subframe 7. It is assumed that a feedback window of the subframe 7 is {a subframe 0, a subframe 1, and a subframe 2}. In this case, a subframe located before the subframe 1 in the feedback window of the subframe 7 is only the subframe 0. In this case, the first information may be 1.

In this embodiment of the present invention, the feedback window of the $(n+k)^{th}$ transmission unit is a set of all transmission units (including the $n^{th}$ transmission unit) for which a downlink data channel acknowledgement response needs to be sent on the uplink control channel of the $(n+k)^{th}$ transmission unit.

Subsequently, the UE may determine a PUCCH resource index of the downlink data channel acknowledgement response of the $n^{th}$ transmission unit in the $(n+k)^{th}$ transmission unit based on the quantity of transmission units that is carried in the configuration information, and further, may determine an acknowledgement response resource uniquely corresponding to the PUCCH resource index.

In this way, for each transmission unit in the feedback window of the $(n+k)^{th}$ transmission unit, because a location of the transmission unit in the feedback window is fixed and unique, different transmission units in the feedback window correspond to different configuration information. Therefore, the UE may determine, according to the foregoing method, an acknowledgement response resource uniquely corresponding to each transmission unit, to avoid a resource conflict between different acknowledgement response resources when the UE uses the different acknowledgement response resources in a same transmission unit in a D-TDD scenario.

It should be noted that, in this embodiment of the present invention, the acknowledgement response may be specifically an ACK (ACKnowlegement) or a NACK (Negative ACKnowledgement). This is not limited in this embodiment of the present invention.

In addition, one transmission unit is a time granularity for uplink transmission or downlink transmission, and may be specifically a subframe, a slot, a mini-slot, an aggregated slot, or an aggregated mini-slot. This is not limited in this embodiment of the present invention. For ease of description, in all the following embodiments, a slot is used as an example of a transmission unit for description.

Figure 2:
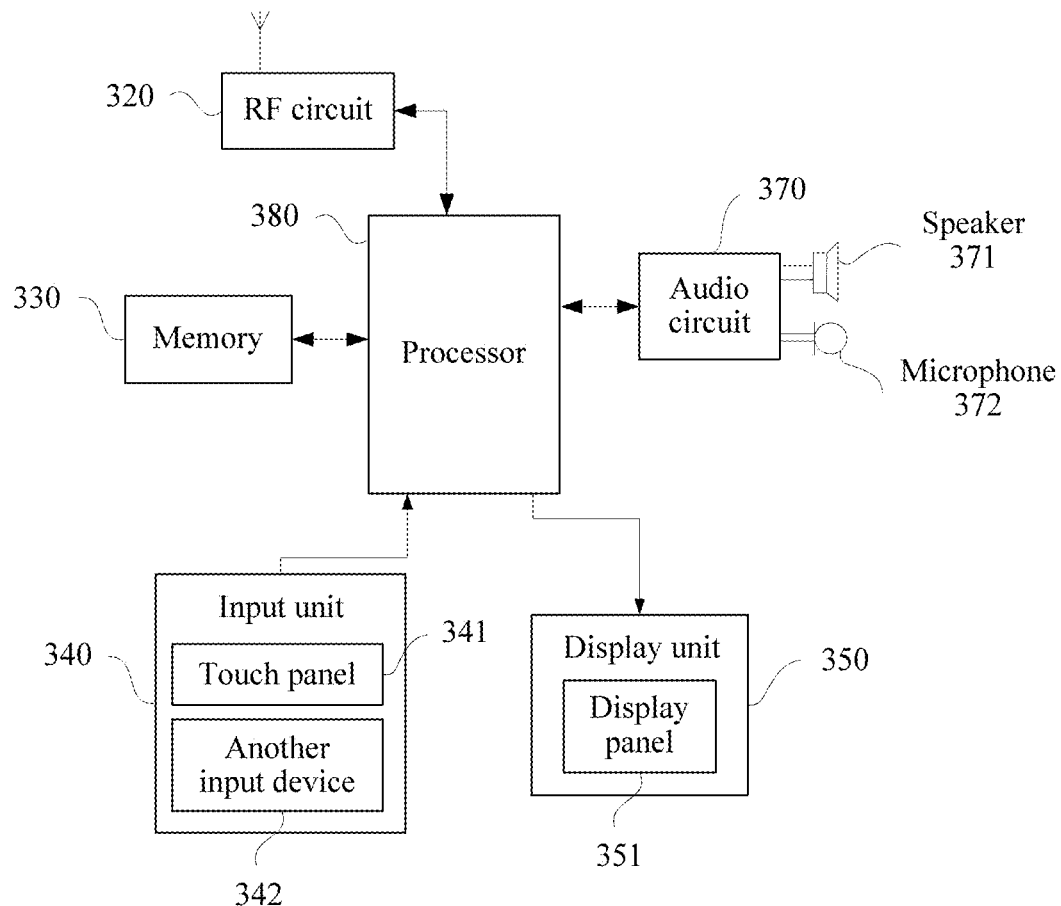
FIG. 2 is a first schematic structural diagram of UE according to an embodiment of the present invention.

For a hardware structure of the UE in this embodiment of the present invention, refer to constituent components of UE shown in FIG. 2. The UE may be a terminal device such as a mobile phone, a tablet computer, a notebook computer, a UMPC (Ultra-mobile Personal Computer), a netbook, or a PDA (Personal Digital Assistant).

As shown in FIG. 2, the UE may specifically include components such as an RF (radio frequency) circuit 320, a memory 330, an input unit 340, a display unit 350, a gravity sensor 360, an audio circuit 370, a processor 380, and a power supply 390. A person skilled in the art may understand that a UE structure shown in FIG. 5 does not constitute any limitation on the UE, and the UE may include more or fewer components than those shown in the figure, or some components are combined, or a different component deployment is used.

The following describes the constituent components of the UE 300 in detail with reference to FIG. 2.

The RF circuit 320 may be configured to receive and send signals in an information receiving and sending process or during a call. Particularly, after receiving downlink information from a base station, the RF circuit 320 sends the downlink information to the processor 380 for processing. In addition, the RF circuit 320 sends uplink data to the base station. Usually, the RF circuit includes but is not limited to an antenna, at least one amplifier, a transceiver, a coupler, an LNA (low noise amplifier, low noise amplifier), a duplexer, and the like. In addition, the RF circuit 320 may communicate with a network and another device through wireless communication.

The memory 330 may be configured to store a software program and a module. The processor 380 runs the software program and the module that are stored in the memory 330, to perform various function applications of the UE and data processing.

The input unit 340 may be configured to receive input digit or character information, and generate a key signal input related to a user setting and function control of the UE. Specifically, the input unit 340 may include a touch panel 341 and another input device 342.

The display unit 350 may be configured to display information entered by a user or information provided for a user and various menus of the UE. The display unit 350 may include a display panel 351. Optionally, the display panel 351 may be configured in a form of an LCD (Liquid Crystal Display), an OLED (Organic Light-Emitting Diode), or the like.

The UE may further include a gravity sensor 360 and another sensor, such as an optical sensor, a gyroscope, a barometer, a hygrometer, a thermometer, or an infrared sensor. Details are not described herein again.

The audio circuit 370, a speaker 371, and a microphone 372 can provide audio interfaces between the user and the UE. The audio circuit 370 may convert received audio data into an electrical signal and transmit the electrical signal to the speaker 371. The speaker 371 converts the electrical signal into a sound signal for output. In addition, the microphone 372 converts a collected sound signal into an electrical signal. The audio circuit 370 receives the electrical signal, converts the electrical signal into audio data, and outputs the audio data to the RF circuit 320, to send the audio data to, for example, another UE, or outputs the audio data to the memory 330 for further processing.

The processor 380 is a control center of the UE, and connects all parts of the entire UE by using various interfaces and lines. By running or executing a software program and/or a module stored in the memory 330 and invoking data stored in the memory 330, the processor 380 performs various functions and/or data processing of the UE, to perform overall monitoring on the UE. Optionally, the processor 380 may include one or more processing units.

Although not shown in the figure, the UE may further include a power supply, a Wi-Fi (wireless fidelity) module, a Bluetooth module, or the like. Details are not described herein.

Figure 3:
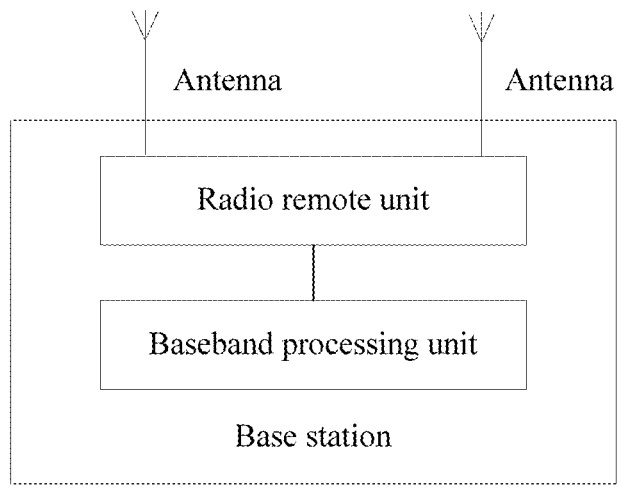
FIG. 3 is a first schematic structural diagram of a base station according to an embodiment of the present invention.

For a hardware structure of the base station in this embodiment of the present invention, refer to constituent components of a base station shown in FIG. 3. As shown in FIG. 3, the base station includes a BBU (baseband processing unit), an RRU (radio remote unit), and an antenna. The BBU and the RRU may be connected by using an optical fiber. The RRU is then connected to the antenna by using a coaxial cable and a power splitter (or coupler). Usually, one BBU may be connected to a plurality of RRUs.

The RRU may include four modules: a digital intermediate frequency module, a transceiver module, a power amplification module, and a filter module. The digital intermediate frequency module is configured to perform modulation and demodulation for optical transmission, digital up-/down-conversion, digital-to-analog conversion, or the like. The transceiver module completes conversion of an intermediate frequency signal to a radio frequency signal. The radio frequency signal is then amplified by the power amplification module and filtered by the filter module, and then the radio frequency signal is transmitted through the antenna.

The BBU is configured to complete a baseband processing function (encoding, multiplexing, modulation, spreading, or the like) of a Uu interface (to be specific, an interface between a terminal device and the base station), an interface function of logical interface between an RNC (English: Radio Network Controller, radio network controller) and the base station, signaling processing, local and remote operation maintenance functions, base station system working status monitoring and alarm information reporting functions, or the like.

Figure 4:
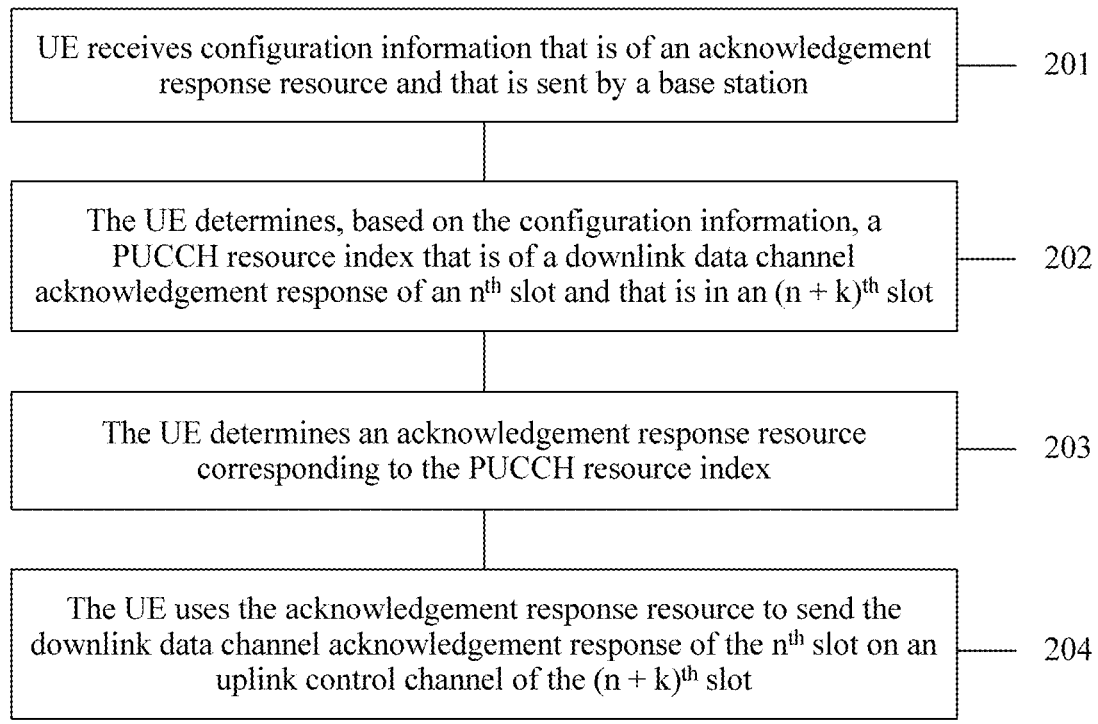
FIG. 4 is a first schematic flowchart of a resource configuration method according to an embodiment of the present invention.

The following describes in detail a resource configuration method provided in an embodiment of the present invention with reference to a specific embodiment. As shown in FIG. 4, the method includes the following operations.

Operation 201. UE receives configuration information that is of an acknowledgement response resource and that is sent by a base station.

Figure 5:
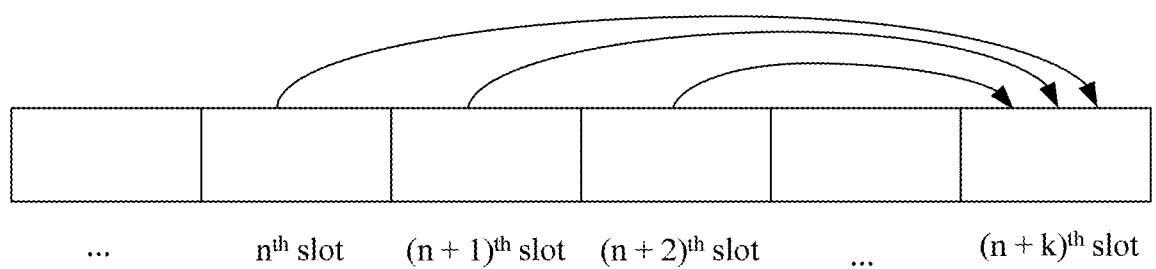
FIG. 5 is a first schematic diagram of an application scenario in which a plurality of acknowledgement responses are replied in a same transmission unit according to an embodiment of the present invention.

As shown in FIG. 5, for downlink data transmitted on a downlink data channel of an $n^{th}$ slot, an acknowledgement response needs to be replied to the base station on an uplink control channel of an $(n+k)^{th}$ slot. In this case, to enable the UE to determine an acknowledgement response resource used for sending the acknowledgement response, the base station may send configuration information of the acknowledgement response resource to the UE.

In one embodiment, the configuration information specifically includes first information, and the first information is used to indicate a quantity of slots located before the $n^{th}$ slot in a feedback window of the $(n+k)^{th}$ slot.

Specifically, the UE may need to reply to the base station with a plurality of acknowledgement responses on the uplink control channel of the $(n+k)^{th}$ slot, in other words, needs to configure a plurality of acknowledgement response resources on the uplink control channel of the $(n+k)^{th}$ slot. In this case, to ensure that the plurality of acknowledgement response resources do not conflict with each other, configuration information of any two of the plurality of acknowledgement response resources needs to be different.

In this case, still as shown in FIG. 5, it is assumed that the feedback window of the $(n+k)^{th}$ slot is {an $n^{th}$ slot, an $(n+1)^{th}$ slot, an $(n+2)^{th}$ slot}. In other words, three acknowledgement response resources need to be used to respectively send an acknowledgement response of the $n^{th}$ slot, an acknowledgement response of the $(n+1)^{th}$ slot, and an acknowledgement response of the $(n+2)^{th}$ slot on the uplink control channel of the $(n+k)^{th}$ slot.

In this case, for the $n^{th}$ slot, because a quantity of slots located before the $n^{th}$ slot in the feedback window of the $(n+k)^{th}$ slot is 0, first information in configuration information 1 received by the UE is 0; for the $(n+1)^{th}$ slot, because a quantity of slots located before the $(n+1)^{th}$ slot in the feedback window of the $(n+k)^{th}$ slot is 1, first information in configuration information 2 received by the UE is 1; and for the $(n+2)^{th}$ slot, because a quantity of slots located before the $(n+2)^{th}$ slot in the feedback window of the $(n+k)^{th}$ slot is 2, first information in configuration information 3 received by the UE is 2.

It can be learned that any two of the configuration information 1, the configuration information 2, and the configuration information 3 are different. Subsequently, because any configuration information is in a one-to-one correspondence with the acknowledgement response resource, the UE may respectively determine an acknowledgement response resource 1 corresponding to the $n^{th}$ slot based on the configuration information 1, determine an acknowledgement response resource 2 corresponding to the $(n+1)^{th}$ slot based on the configuration information 2, and determine an acknowledgement response resource 3 corresponding to the $(n+2)^{th}$ slot based on the configuration information 3. In this way, the acknowledgement response resource 1, the acknowledgement response resource 2, and the acknowledgement response resource 3 do not conflict with one another.

It should be noted that the configuration information may alternatively be the quantity of slots located before the $n^{th}$ slot in the feedback window of the $(n+k)^{th}$ slot plus 1. In other words, the configuration information includes the $n^{th}$ slot. For example, still as shown in FIG. 5, for the $n^{th}$ slot, the quantity of slots located before the $n^{th}$ slot in the feedback window of the $(n+k)^{th}$ slot is 0. If the $n^{th}$ slot is counted, the quantity is 0+1=1. In this case, the configuration information 1 is 1, the configuration information 2 is 2, and the configuration information 3 is 3.

It can be learned that any two of the configuration information 1, the configuration information 2, and the configuration information 3 are still different. Therefore, it may be understood that the configuration information may be the quantity of slots located before the $n^{th}$ slot in the feedback window of the $(n+k)^{th}$ slot plus a fixed offset, where the fixed offset may be any value. This is not limited in this embodiment of the present invention.

In another embodiment, the configuration information may further include second information, and the second information is used to indicate a size of the feedback window of the $(n+k)^{th}$ slot. For example, as shown in FIG. 5, if the feedback window of the $(n+k)^{th}$ slot is {an $n^{th}$ slot, an $(n+1)^{th}$ slot, an $(n+2)^{th}$ slot}, a size of the feedback window of the $(n+k)^{th}$ slot is 3. In this case, the second information may be 3.

In one embodiment, the base station may use determined information about uplink slot and downlink slot distribution in S (S≥1) slots and determined information about a feedback window of each uplink slot as the configuration information and send the configuration information to the UE. For example, the base station determines, based on a current load status of the UE, that information about uplink slot and downlink slot distribution in a first slot to a fifth slot is 10110

(1 is used to indicate a downlink slot, and 0 is used to indicate an uplink slot). In addition, an acknowledgement response of the first slot needs to be fed back to the base station in the second slot, and acknowledgement responses of the third slot and the fourth slot need to be fed back to the base station in the fifth slot. In other words, information about of a feedback window of the second slot is {1}, and information about a feedback window of the fourth slot is {3, 4}. Alternatively, information about a feedback window of the second slot may be an offset between the first slot and the second slot: 1; and information about a feedback window of the fourth slot may include an offset between the third slot and the fifth slot: 2, and an offset between the fourth slot and the fifth slot: 1.

In this case, the information about the uplink slot and downlink slot distribution in the first slot to the fifth slot and the information about the feedback window of each uplink slot that are determined by the base station may be used as the first information and the second information.

It is assumed that the $n^{th}$ slot is the third slot, and the $(n+k)^{th}$ slot is the fourth slot. Subsequently, the UE may determine, based on the information that is about the feedback window of the fourth slot and that is carried in the configuration information, that a size of the feedback window of the fourth slot is 2, and a quantity of slots located before the third slot in the feedback window of the fourth slot is 1.

In addition, the base station may add the configuration information to physical layer signaling (such as DCI (Downlink Control Information)), broadcast signaling (such as signaling carried by a PBCH (Physical Broadcast Channel)), or higher layer signaling (such as an SIB (System Information Block) or RRC (Radio Resource Control)), and send the configuration information to the UE by using the physical layer signaling, the broadcast signaling, or the higher layer signaling.

The following describes in detail, by using operations 202 and 203, a method used by the UE to determine an acknowledgement response resource by using configuration information.

Operation 202. The UE determines, based on the configuration information, a PUCCH resource index that is of a downlink data channel acknowledgement response of an $n^{th}$ slot and that is in the $(n+k)^{th}$ slot.

In a possible implementation, if the configuration information in operation 201 includes only first information, for example, the first information is m (m≥0), that is, the quantity of slots located before the $n^{th}$ slot in the feedback window of the $(n+k)^{th}$ slot is m, the UE may calculate a PUCCH resource index $n_{PUCCH}$ that is of the downlink data channel acknowledgement response of the $n^{th}$ slot and that is in the $(n+k)^{th}$ slot according to the following formula (1):

$$n_{PUCCH} = n_{CCE,q} + \Sigma_{i1=0}^{m-1} N_{CCE,q,n-k_{i1}} + \Delta_{ARO} + N_{PUCCH}^{(1)} \quad \text{formula (1)}$$

$N_{PUCCH}^{(1)}$ is configured by the base station for the UE by using RRC signaling, $\Delta_{ARO}$ is configured by the base station for the UE by using dynamic signaling, $n_{CCE,q}$ is an index that is last received by the UE and that is of a first CCE in which DCI is located in a $q^{th}$ PDCCH set corresponding to a PDSCH in the feedback window of the $(n+k)^{th}$ slot (the base station preconfigures q PDCCH sets for the UE, and q is an integer). These parameters can all be predetermined by the UE.

$\Sigma_{i1=0}^{m-1} N_{CCE,q,n-k_{i1}}$ an is a total quantity that is calculated by the UE based on the first information m and that is of CCEs occupied by $q^{th}$ PDCCH sets corresponding to PDSCHs in all slots located before the $n^{th}$ slot in the feedback window of the $(n+k)^{th}$ slot.

In another embodiment, if the configuration information in operation 201 includes first information and second information, for example, the first information is m (m≥0), that is, the quantity of slots located before the $n^{th}$ slot in the feedback window of the $(n+k)^{th}$ slot is m, and the second information is M (M≥0), in other words, the size of the feedback window of the $(n+k)^{th}$ slot is M, the UE may calculate a PUCCH resource index $n_{PUCCH}$ that is of the downlink data channel acknowledgement response of the $n^{th}$ slot and that is in the $(n+k)^{th}$ slot according to the following formula (2):

$$n_{PUCCH} = (M-m-1) \cdot N_c + m \cdot N_{c+1} + n_{CCE} + N_{PUCCH}^{(1)} \quad \text{formula (2)}$$

$N_{PUCCH}^{(1)}$ is configured by the base station for the UE by using RRC signaling, c belongs to {0, 1, 2, 3}, and satisfies $N_c \leq N_{CCE,i} \leq N_{c+1}$, $N_c = \max\{0, \lfloor [N_{RB}^{DL} \cdot (N_{sc}^{RB} \cdot c - 4)]/36 \rfloor\}$, $n_{CCE}$ is an index of a first CCE in which DCI that is last received by the UE and that corresponds to the PDSCH in the feedback window of the $(n+k)^{th}$ slot is located, $N_{RB}^{DL}$ is a quantity of RBs corresponding to a downlink control channel in frequency domain, and $N_{sc}^{RB}$ is a quantity of subcarriers included in one RB. These parameters can all be predetermined by the UE.

m in formula (2) is the quantity of slots located before the $n^{th}$ slot in the feedback window of the $(n+k)^{th}$ slot in the first information. M is the size of the feedback window of the $(n+k)^{th}$ slot in the second information.

In another embodiment, the base station may alternatively directly use a value of $i_{i1=0}^{m-1} N_{CCE,q,n-k_{i1}}$ in the formula (1), to be specific, a total quantity of CCEs occupied by $q^{th}$ PDCCH sets corresponding to PDSCHs in all slots located before the $n^{th}$ slot in the feedback window of the $(n+k)^{th}$ slot, as the configuration information, and send the configuration information to the UE. Subsequently, the UE may still calculate, according to the formula (1), a PUCCH resource index that is of an acknowledgement response of a PDSCH of the $n^{th}$ slot and that is in the $(n+k)^{th}$ slot.

Further, not all CCEs in the total quantity of CCEs occupied by the $q^{th}$ PDCCH set correspond to downlink data scheduling. Therefore, some of PUCCH resources reserved based on the total quantity of CCEs occupied by the $q^{th}$ PDCCH set do not need to be used to send acknowledgement responses. This causes numerous resource holes in PUCCH resources. Therefore, the base station may alternatively use a quantity of CCEs occupied by PDCCHs corresponding to PDSCHs that actually need to be used to send acknowledgement responses in the $(n+k)^{th}$ slot and that is in all slots located before an $n^{th}$ downlink slot in the feedback window of the $(n+k)^{th}$ slot as the configuration information, and send the configuration information to the UE. This can reduce resource fragments of the PUCCHs and improve resource utilization.

It should be noted that the CCE used in this embodiment of the present invention is a control channel element in an NR system, and a structure of the CCE may be set by a person skilled in the art based on actual experience. This is not limited in this embodiment of the present invention.

Operation 203. The UE determines an acknowledgement response resource corresponding to the PUCCH resource index.

There is a correspondence between different PUCCH resource indexes and at least one of the following resource indexes: a subcarrier index, a symbol index, an orthogonal sequence index, and a cyclic shift.

In this case, based on the PUCCH resource index determined in operation 202, at least one of a subcarrier index, a symbol index, an orthogonal sequence index, and a cyclic shift that correspond to the PUCCH resource index can be determined.

There is a correspondence between the subcarrier index and a frequency domain resource. There is a correspondence between the symbol index and a time domain resource. There is a correspondence between the orthogonal sequence index and a code domain resource. There is a correspondence between a cyclic shift and a space domain resource.

Therefore, the corresponding frequency domain resource can be determined on the uplink control channel of the $(n+k)^{th}$ slot based on the subcarrier index corresponding to the PUCCH resource index. The corresponding time domain resource can be determined on the uplink control channel of the $(n+k)^{th}$ slot based on the symbol index corresponding to the PUCCH resource index. The corresponding code domain resource can be determined on the uplink control channel of the $(n+k)^{th}$ slot based on the symbol index corresponding to the PUCCH resource index. The corresponding space domain resource can be determined on the uplink control channel of the $(n+k)^{th}$ slot based on the cyclic shift corresponding to the PUCCH resource index. At least one of the determined frequency domain resource, time domain resource, code domain resource, and space domain resource is the acknowledgement response resource corresponding to the configuration information in operation 201.

Operation 204. The UE uses the acknowledgement response resource to send the downlink data channel acknowledgement response of the $n^{th}$ slot on an uplink control channel of the $(n+k)^{th}$ slot.

Figure 6:
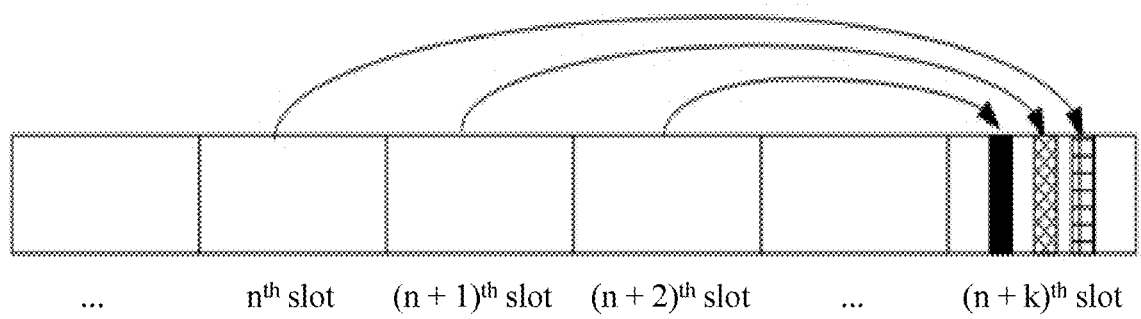
FIG. 6 is a second schematic diagram of an application scenario in which a plurality of acknowledgement responses are replied in a same transmission unit according to an embodiment of the present invention.

For example, as shown in FIG. 6, the UE may determine, by using operations 202 and 203 and based on the configuration information that corresponds to the $n^{th}$ slot and that is sent by the base station, the acknowledgement response resource 1 that is used to send the acknowledgement response 1 on the uplink control channel of the $(n+k)^{th}$ slot, and the UE may determine, by using operations 202 and 203 and based on the configuration information that corresponds to the $(n+1)^{th}$ slot and that is sent by the base station, the acknowledgement response resource 2 that is used to send the acknowledgement response 2 on the uplink control channel of the $(n+k)^{th}$ slot. Similarly, the UE may determine, by using operations 202 and 203 and based on the configuration information that corresponds to the $(n+2)^{th}$ slot and that is sent by the base station, the acknowledgement response resource 3 that is used to send the acknowledgement response 3 on the uplink control channel of the $(n+k)^{th}$ slot.

Further, the UE maps the to-be-sent acknowledgement response 1 to the acknowledgement response resource 1, maps the to-be-sent acknowledgement response 2 to the acknowledgement response resource 2, and maps the to-be-sent acknowledgement response 3 to the acknowledgement response resource 3.

Subsequently, in operation 204, the UE uses the acknowledgement response resource 1, the acknowledgement response resource 2, and the acknowledgement response resource 3 to send the downlink data channel acknowledgement response of the $n^{th}$ slot, a downlink data channel acknowledgement response of the $(n+1)^{th}$ slot, and a downlink data channel acknowledgement response of the $(n+2)^{th}$ slot on the uplink control channel of the $(n+k)^{th}$ slot respectively, to implement a transmission process of a downlink data channel acknowledgement response in any slot in a D-TDD scenario.

In addition, for a PUCCH with short duration (short duration), if the UE determines the subcarrier index and the symbol index that correspond to the PUCCH resource index in operation 203, during resource mapping, the UE may map the downlink data channel acknowledgement response 1 of the $n^{th}$ slot to the acknowledgement response resource 1 first in ascending order of subcarrier indexes and then in descending order of symbol indexes.

Figure 7:
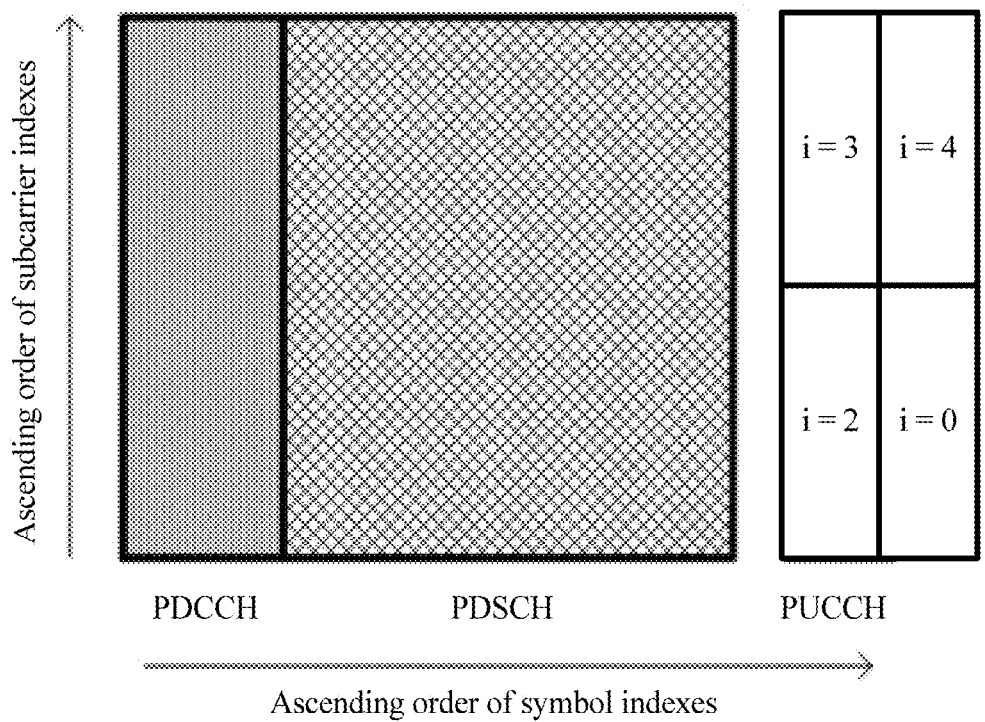
FIG. 7 is a schematic structural diagram of a transmission unit according to an embodiment of the present invention.

For example, FIG. 7 is a schematic diagram of an $(n+k)^{th}$ slot including a PUCCH with short duration. The $(n+k)^{th}$ slot includes a PDCCH, a PDSCH (the PDSCH is used to transmit downlink data) located after the PDCCH, and the PUCCH located after the PDSCH. It can be learned that the PUCCH is usually located on last one to two symbols in one slot. When the base station transmits downlink data in an $n^{th}$ slot, the base station may determine that an acknowledgement response needs to be fed back on the PUCCH of the $(n+k)^{th}$ slot for the downlink data transmitted in the $n^{th}$ slot. However, the base station probably cannot determine that an acknowledgement response also needs to be fed back on the PUCCH of the $(n+k)^{th}$ slot for downlink data transmitted in an $(n+1)^{th}$ slot or an $(n+2)^{th}$ slot.

In this case, if resource mapping is performed in ascending order of subcarrier indexes and in ascending order of symbol indexes, as shown in FIG. 7, the downlink data channel acknowledgement response 1 of the $n^{th}$ slot is mapped to a location at which i=2. In other words, a PUCCH resource at the location at which i=2 is the acknowledgement response resource 1. If subsequently no acknowledgement response needs to be fed back on the PUCCH of the $(n+k)^{th}$ slot for the downlink data transmitted in the $(n+1)^{th}$ slot or the $(n+2)^{th}$ slot, in the PUCCH, PUCCH resources at locations at which i=0, i=1, and i=3 are wasted. When resource mapping is performed first in ascending order of frequency domains and then in descending order of time domains, the downlink data channel acknowledgement response 1 of the $n^{th}$ slot is mapped to the location at which i=0. If subsequently no acknowledgement response needs to be fed back on the PUCCH of the $(n+k)^{th}$ slot for the downlink data transmitted in the $(n+1)^{th}$ slot or the $(n+2)^{th}$ slot, the UE may use PUCCH resources at locations at which i=2 and i=3 in FIG. 7 as PDSCH resources, to transmit downlink data, thereby flexibly configuring the PUCCH resources and reducing a waste of the PUCCH resources.

Therefore, for the PUCCH with short duration, as shown in FIG. 7, the UE may calculate a parameter $i=f(n_{PUCCH})$ based on the PUCCH resource index $n_{PUCCH}$, where the function $f(n_{PUCCH})$ is a monotonically increasing function. In this way, for two acknowledgement response resources located on different symbols, an acknowledgement response resource for which a value of $n_{PUCCH}$ is smaller has a smaller symbol index; and for two acknowledgement response resources located on a same symbol, an acknowledgement response resource for which a value of $n_{PUCCH}$ is smaller has a smaller subcarrier index.

Figure 8:
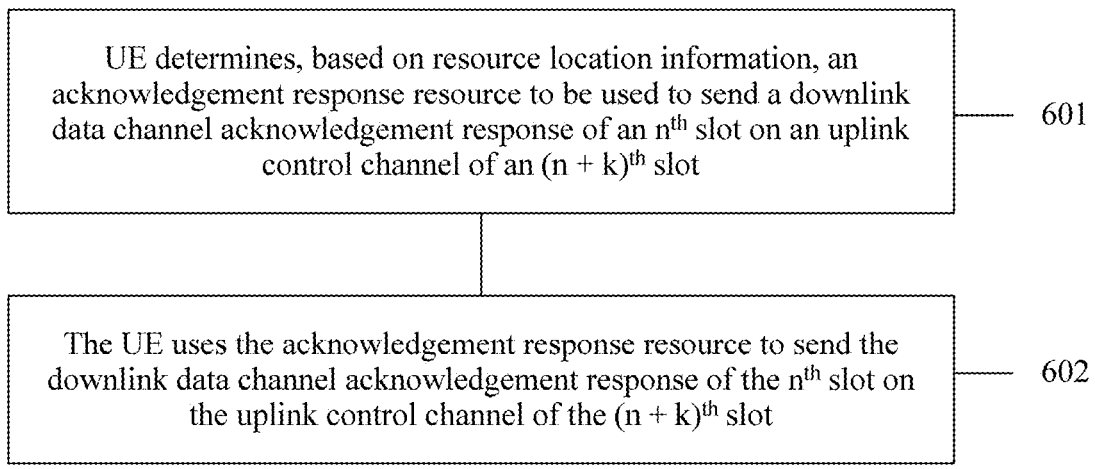
FIG. 8 is a second schematic flowchart of a resource configuration method according to an embodiment of the present invention.

In another embodiment, a resource configuration method is provided. The resource configuration method can be implicit. To be specific, UE can determine, without a need to receive configuration information sent by a base station, different acknowledgement response resources used when different acknowledgement responses are sent on an uplink control channel of an $(n+k)^{th}$ slot, thereby preventing the different acknowledgement response resources from conflicting with each other. Specifically, as shown in FIG. 8, the method includes the following operations.

Operation 601. The UE determines, based on resource location information, an acknowledgement response resource to be used to send a downlink data channel acknowledgement response of an $n^{th}$ slot on the uplink control channel of the $(n+k)^{th}$ slot.

Operation 602. The UE uses the acknowledgement response resource to send the downlink data channel acknowledgement response of the $n^{th}$ slot on the uplink control channel of the $(n+k)^{th}$ slot.

The resource location information includes a first parameter and a second parameter.

The first parameter is used to indicate a time offset K between a time at which the UE receives DCI corresponding to downlink data of the $n^{th}$ slot and a time at which the UE sends the downlink data channel acknowledgement response of the $n^{th}$ slot.

Specifically, the time offset K between the time at which the UE receives the DCI corresponding to the downlink data of the $n^{th}$ slot and the time at which the UE sends the downlink data channel acknowledgement response of the $n^{th}$ slot includes a first offset K1 between a time at which the UE receives the DCI corresponding to the downlink data of the $n^{th}$ slot and a time at which the UE transmits the downlink data in the $n^{th}$ slot, and a second offset K2 between a time at which the UE transmits the downlink data in the $n^{th}$ slot and a time at which the UE sends the downlink data channel acknowledgement response of the $n^{th}$ slot. In other words, K=K1+K2.

Figure 9:
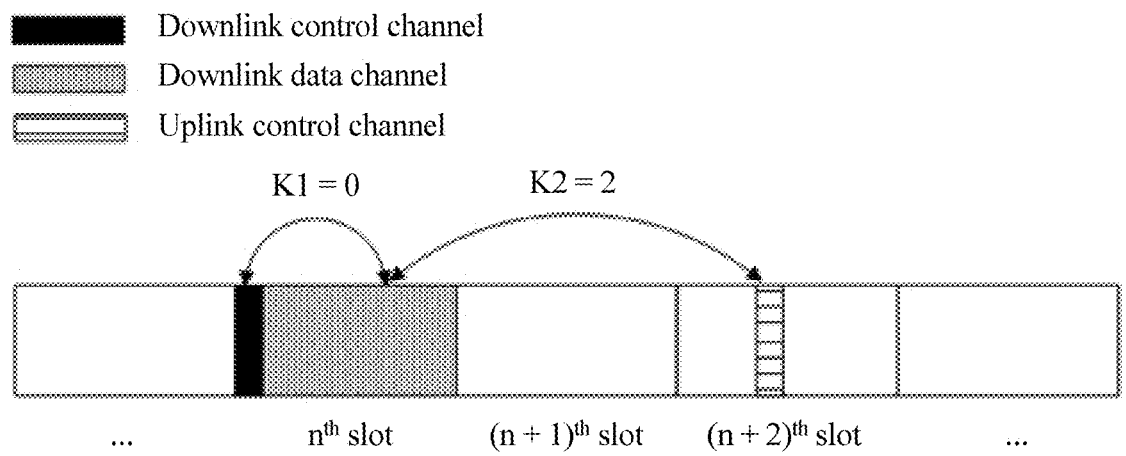
FIG. 9 is a third schematic diagram of an application scenario in which a plurality of acknowledgement responses are replied in a same transmission unit according to an embodiment of the present invention.
Figure 9:
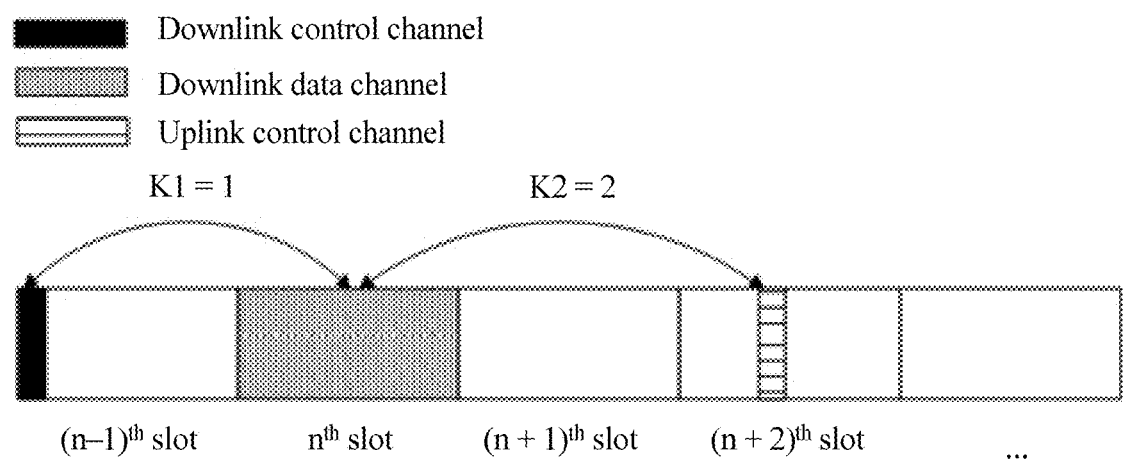

For example, as shown in (a) in FIG. 9, the UE receives the DCI on a downlink control channel of the $n^{th}$ slot and transmits the downlink data on a downlink data channel of the $n^{th}$ slot. Subsequently, the UE sends an acknowledgement response of the $n^{th}$ slot on an uplink control channel of an $(n+2)^{th}$ slot. In this case, the first offset K1=0, and the second offset K2=2.

Alternatively, as shown in (b) in FIG. 9, the UE receives the DCI on a downlink control channel of an $(n-1)^{th}$ slot and transmits the downlink data on a downlink data channel of the $n^{th}$ slot. Subsequently, the UE sends an acknowledgement response of the $n^{th}$ slot on an uplink control channel of an $(n+2)^{th}$ slot. In this case, the first offset K1=1, and the second offset K2=2.

In this case, the first parameter may be specifically the sum K of the first offset K1 and the second offset K2, or may be the first offset K1 and the second offset K2. In other words, the first parameter may be a value of a function using the first offset K1 and the second offset K2 as variables. First parameters respectively corresponding to any two UEs from different PDCCHs are usually different.

Further, the second parameter is an index of a first PRB (Physical Resource Block, physical resource block) used when the UE transmits the downlink data in the $n^{th}$ slot, or an index of a first CCE used when the UE receives the DCI. The second parameter can be used to distinguish any two UEs from a same PDCCH.

For example, if indexes are centrally allocated to CCEs occupied by PDCCHs in a same cell, in other words, an index of a CCE is of a cell level, an index of a CCE used by each UE is known to all UEs in the cell. In this case, numbers of first CCEs used by two different UEs on a same PDCCH are usually different. Therefore, the second parameter may be an index $n_{CCE}$ of a first CCE used when the UE receives the DCI.

If CCEs occupied by PDCCHs in a same cell are determined by UEs, because any UE in the cell does not know an index of a CCE used by another UE in the cell, numbers of first CCEs used by two different UEs on a same PDCCH may be the same. In this case, use of an index of a first CCE used when the UE receives the DCI cannot distinguish any two UEs from a same PDCCH. In addition, an index of a PRB used when the UE transmits the downlink data on the PDSCH is of a cell level. Therefore, the second parameter is an index $I_{PRB}$ of a first PRB used when the UE transmits the downlink data in the $n^{th}$ slot.

Specifically, the UE may determine, according to the following formula (3), a PUCCH resource index $n_{PUCCH}$ that is of the downlink data channel acknowledgement response of the $n^{th}$ slot and that is in the $(n+k)^{th}$ slot.

For example, when the first parameter is K, and the second parameter is $n_{CCE}$, the formula (3) is $n_{PUCCH}=F1(K)+T1(n_{CCE})$.

When the first parameter is K, and the second parameter is $I_{PRB}$, the formula (3) is $n_{PUCCH}=F1(K)+T2(I_{PRB})$.

When the first parameter is K1 and K2, and the second parameter is $n_{CCE}$, the formula (3) is $n_{PUCCH}=F2(K1, K2)+T1(n_{CCE})$.

When the first parameter is K1 and K2, and the second parameter is $I_{PRB}$, the formula (3) is $n_{PUCCH}=F2(K1, K2)+T2(I_{PRB})$.

For any two UEs, first parameters and/or second parameters respectively corresponding to the two UEs are usually different. Therefore, the UE can determine a unique PUCCH resource index according to the formula (3), to determine an acknowledgement response resource uniquely corresponding to the PUCCH resource index.

Further, in an application scenario in which MU-MIMO (Multi-User Multiple-Input Multiple-Output, multi-user multiple-input multiple-output) is used for a data channel, different UEs multiplex a same PRB; and in an application scenario in which MU-MIMO is used for a control channel, different UEs multiplex a same CCE. In this case, the second parameter can be used to distinguish any two UEs from a same PDCCH.

The UEs may use different antenna ports or scrambled IDs to ensure data orthogonality in a data transmission process. Therefore, the resource location information may further include a third parameter or a fourth parameter.

The third parameter includes a number $p_0$ of an antenna port used when the base station sends the downlink data in the $n^{th}$ slot, or a scrambled ID of a reference signal used when the UE receives the downlink data in the $n^{th}$ slot, for example, a scrambled ID of a DMRS (DeModulation Reference Signal, demodulation reference signal), that is, $n_{DMRS}^0$.

The fourth parameter includes a number $p_1$ of an antenna port used when the base station sends the DCI, or a scrambled ID of a DMRS used when the UE receives the DCI, that is, $n_{DMRS}^1$.

A formula for calculating an initialization sequence $c_{init}$ of the DMRS is:

$$c_{init}=(\lfloor n_s+1 \rfloor)\cdot(2n_{DMRS}^{(1)})\cdot 2^{16}+n_{DMRS}^{(2)}.$$

$n_s$ is a slot number, $n_{DMRS}^{(1)}$ and/or $n_{DMRS}^{(2)}$ is the scrambled ID of the DMRS in the third parameter or the fourth parameter, to be specific, $n_{DMRS}^0=n_{DMRS}^{(1)}$ and/or $n_{DMRS}^{(2)}$; $n_{DMRS}^1=n_{DMRS}^{(1)}$ and/or $n_{DMRS}^{(2)}$.

For example, when the second parameter is $i_{PRB}$, the resource location information includes the third parameter. In this case, it is assumed that the first parameter is K. The UE may determine, according to the following formula (4-1), a PUCCH resource index $n_{PUCCH}$ that is of the downlink data channel acknowledgement response of the $n^{th}$ slot and that is in the $(n+k)^{th}$ slot. The formula (4-1) is:

$$n_{PUCCH}=F1(K)+T2(I_{PRB})+W1(p_0), \text{ or}$$

$$n_{PUCCH}=F1(K)+T2(I_{PRB})+W1(n_{DMRS}^0).$$

When the second parameter is $n_{CCE}$, the resource location information further includes the fourth parameter. In this case, it is assumed that the first parameter is K. The UE may determine, according to the following formula (4-2), a PUCCH resource index $n_{PUCCH}$ that is of the downlink data channel acknowledgement response of the $n^{th}$ slot and that is in the $(n+k)^{th}$ slot. The formula (4-2) is:

$$n_{PUCCH}=F1(K)+T1(n_{CCE})+W2(p_1), \text{ or}$$

$$n_{PUCCH}=F1(K)+T1(n_{CCE})+W2(n_{DMRS}^1).$$

In this way, the UE may determine, according to the formula (4-1) or formula (4-2), a unique PUCCH resource index. Subsequently, similar to operations 203 and 204, the UE determines the acknowledgement response resource corresponding to the PUCCH resource index, and finally, uses the acknowledgement response resource to send the downlink data channel acknowledgement response of the $n^{th}$ slot on the uplink control channel of the $(n+k)^{th}$ slot.

The foregoing has mainly described the solutions provided in the embodiments of the present invention from a perspective of interaction between the network elements. It may be understood that, to implement the foregoing functions, the UE and the base station include corresponding hardware structures and/or software modules for performing the functions. A person skilled in the art should be easily aware that units and algorithm operations in the examples described with reference to the embodiments disclosed in this specification can be implemented in a form of hardware or in a form of a combination of hardware and computer software in the present invention. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In an embodiment of the present invention, function modules of the UE and the base station may be divided based on the foregoing method examples. For example, each function module may be divided corresponding to each function, or two or more functions may be integrated into one processing module. The integrated module may be implemented in a form of hardware, or may be implemented in a form of a function module of software. It should be noted that the division of the modules in the embodiments of the present invention is an example and is merely logical function division. In actual implementation, there may be another division manner.

Figure 10:
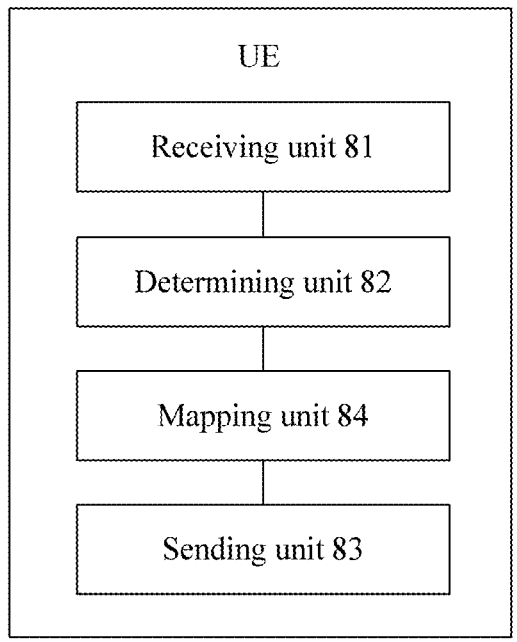
FIG. 10 is a second schematic structural diagram of UE according to an embodiment of the present invention.

When function modules corresponding to various functions are obtained through division, FIG. 10 is a possible schematic structural diagram of the UE used in the foregoing embodiments. The UE includes a receiving unit 81, a determining unit 82, a sending unit 83, and a mapping unit 84. The receiving unit 81 is configured to support the UE in performing the process 201 in FIG. 4. The determining unit 82 is configured to support the UE in performing the processes 202 and 203 in FIG. 4. The sending unit 83 is configured to support the UE the process 204 in FIG. 4. The mapping unit 84 is configured to support the UE in mapping an acknowledgement response resource to an uplink control channel of an $(n+k)^{th}$ transmission unit first in ascending order of subcarrier indexes and then in descending order of symbol indexes. All related content of operations in the foregoing method embodiments may be cited in function descriptions of corresponding function modules, and details are not described herein again.

Figure 11:
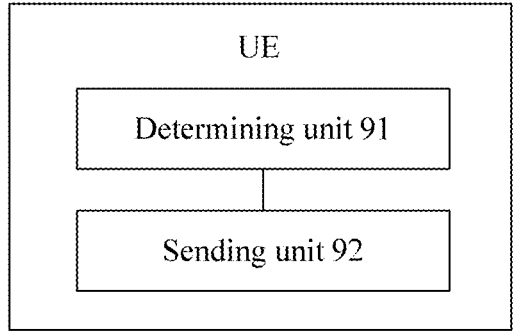
FIG. 11 is a third schematic structural diagram of UE according to an embodiment of the present invention.

When function modules corresponding to various functions are obtained through division, FIG. 11 is another possible schematic structural diagram of the UE used in the foregoing embodiments. The UE includes a determining unit 91 and a sending unit 92. The determining unit 91 is configured to support the UE in performing the process 601 in FIG. 8. The sending unit 92 is configured to support the UE in performing the process 602 in FIG. 8. All related content of operations in the foregoing method embodiments may be cited in function descriptions of corresponding function modules, and details are not described herein again.

Figure 12:
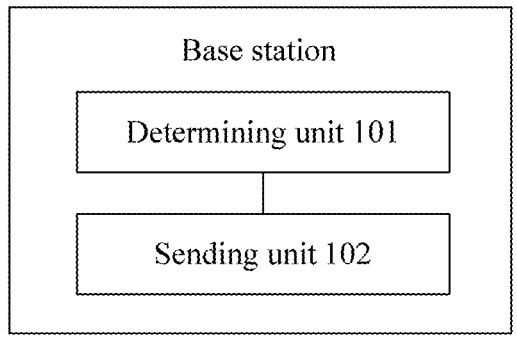
FIG. 12 is a second schematic structural diagram of a base station according to an embodiment of the present invention.

When function modules corresponding to various functions are obtained through division, FIG. 12 is a possible schematic structural diagram of the base station used in the foregoing embodiments. The base station includes a determining unit 101 and a sending unit 102. The determining unit 101 is configured to determine location information of an acknowledgement response resource, where the acknowledgement response resource is used by UE to send a downlink data channel acknowledgement response of an $n^{th}$ transmission unit on an uplink control channel of an $(n+k)^{th}$ transmission unit, the configuration information includes first information, and the first information is used to indicate a quantity of transmission units located before the $n^{th}$ transmission unit in a feedback window of the $(n+k)^{th}$ transmission unit. The sending unit 102 is configured to send the configuration information of the acknowledgement response resource to the UE. All related content of operations in the foregoing method embodiments may be cited in function descriptions of corresponding function modules, and details are not described herein again.

Figure 13:
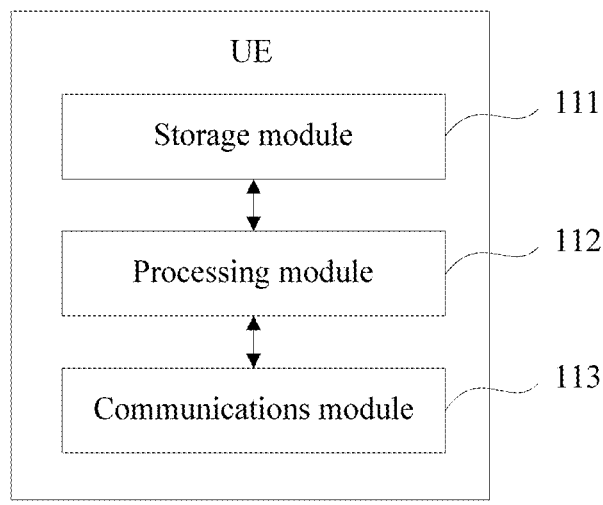
FIG. 13 is a fourth schematic structural diagram of UE according to an embodiment of the present invention.

When an integrated unit is used, FIG. 13 is a possible schematic structural diagram of the UE used in the foregoing embodiments. The UE includes a processing module 112 and a communications module 113. The processing module 112 is configured to control and manage actions of the UE. For example, the processing module 112 is configured to support the UE in performing the processes 201 to 204 in FIG. 4 and the processes 601 and 602 in FIG. 8, and/or is configured to perform another process of the technology described in this specification. The communications module 113 is configured to support communication between the UE and another network entity. The UE may further include a storage module 111, configured to store program code and data of the UE.

Figure 14:
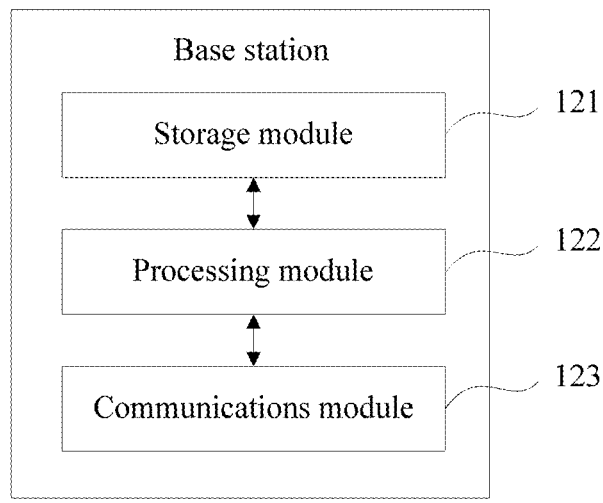
FIG. 14 is a third schematic structural diagram of a base station according to an embodiment of the present invention.

When an integrated unit is used, FIG. 14 is a possible schematic structural diagram of the base station used in the foregoing embodiments. The base station includes a processing module 122 and a communications module 123. The processing module 122 is configured to control and manage actions of the base station. For example, the processing module 122 is configured to support the base station in performing the process 201 in FIG. 4, and/or is configured to perform another process of the technology described in this specification. The communications module 123 is configured to support communication between the UE and another network entity. The base station may further include a storage module 121, configured to store program code and data of the base station.

The processing module 112/122 may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processing module 112/122 may implement or execute various example logical blocks, modules, and circuits that are described with reference to the content disclosed in the present invention. The processor may also be a combination implementing a computing function, for example, a combination including one or more microprocessors or a combination of a DSP and a microprocessor. The communications module 113/123 may be a transceiver, a transceiver circuit, a communications interface, or the like. The storage module 111/121 may be a memory.

Further, an embodiment of the present invention further provides a computer program, where the computer program includes an instruction, and when the computer program is executed by a computer, the computer can perform the related resource configuration method in operations 201 to 204 or in operations 601 and 602.

Further, an embodiment of the present invention further provides a computer storage medium, configured to store a computer software instruction used by the foregoing UE or base station, where the computer software instruction includes any program designed for executing the foregoing UE or base station.

A person skilled in the art should be aware that in one or more of the foregoing examples, the functions described in the present invention may be implemented by using hardware, software, firmware, or any combination thereof. When being implemented by using software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

In the foregoing specific implementations, the objective, technical solutions, and beneficial effects of the present invention are further described in detail. It should be understood that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A resource configuration method, comprising:
receiving, by user equipment (UE), configuration information of an acknowledgement response resource, wherein the acknowledgement response resource is used by the UE to send a downlink data channel acknowledgement response of an $n^{th}$ transmission unit on an uplink control channel of an $(n+k)^{th}$ transmission unit, the configuration information comprises first information, the first information is used to indicate a quantity of transmission units located before the $n^{th}$ transmission unit in a feedback window of the $(n+k)^{th}$ transmission unit, the feedback window is a set of all transmission units for which a downlink data channel acknowledgement response needs to be sent on the uplink control channel of the $(n+k)^{th}$ transmission unit, the $n^{th}$ transmission unit is one of all the transmission units, k is an integer, and n is an integer; and
sending, by the UE, the downlink data channel acknowledgement response of the $n^{th}$ transmission unit on the uplink control channel of the $(n+k)^{th}$ transmission unit based on the configuration information by using the acknowledgement response resource,
wherein the acknowledgement response resource is mapped to the uplink control channel of the $(n+k)^{th}$ transmission unit first in ascending order of subcarrier indexes and then in descending order of symbol indexes.

2. The method according to claim 1, wherein the acknowledgement response resource is determined based on the first information.

3. The method according to claim 1, wherein the configuration information further comprises second information, and the second information is used to indicate a size of the feedback window of the $(n+k)^{th}$ transmission unit.

4. The method according to claim 3, wherein the acknowledgement response resource is determined based on the first information and the second information.

5. The method according to claim 1, wherein the receiving, by UE, configuration information of an acknowledgement response resource comprises:
receiving, by the UE by using physical layer signaling, broadcast signaling, or higher layer signaling, the configuration information that is of the acknowledgement response resource and that is sent by a base station.

6. The resource configuration method according to claim 1, wherein a ratio of a quantity of uplink transmission units to a quantity of downlink transmission units for the downlink data channel and uplink control channel is not fixed.

7. A resource configuration method, comprising:
sending, by user equipment (UE), a downlink data channel acknowledgement response of an $n^{th}$ transmission unit on an uplink control channel of an $(n+k)^{th}$ transmission unit by using an acknowledgement response resource, wherein the acknowledgement response resource is determined based on resource location information, the resource location information comprises a first parameter and a second parameter, k is an integer, and n is an integer, wherein
the first parameter is used to indicate a time offset between a time at which the UE receives downlink control information (DCI) corresponding to downlink data of the $n^{th}$ transmission unit and a time at which the UE sends the downlink data channel acknowledgement response of the $n^{th}$ transmission unit; and
the second parameter comprises an index of a first physical resource block PRB used when the downlink data is sent in the $n^{th}$ transmission unit, or an index of a first control channel element (CCE) used when the DCI is sent,
wherein the acknowledgement response resource is mapped to the uplink control channel of the $(n+k)^{th}$ transmission unit first in ascending order of subcarrier indexes and then in descending order of symbol indexes.

8. The method according to claim 7, wherein the resource location information further comprises a third parameter, and
the third parameter comprises a number of an antenna port used when a base station sends the downlink data in the $n^{th}$ transmission unit, or a scrambled ID of a reference signal used when the UE receives the downlink data in the $n^{th}$ transmission unit.

9. The method according to claim 7, wherein the resource location information further comprises a fourth parameter, and the fourth parameter comprises a number of an antenna port used when a base station sends the DCI, or a scrambled ID of a reference signal used when the UE receives the DCI.

10. User equipment (UE), comprising:

a receiving unit, configured to receive configuration information of an acknowledgement response resource, wherein the acknowledgement response resource is used by the UE to send a downlink data channel acknowledgement response of an $n^{th}$ transmission unit on an uplink control channel of an $(n+k)^{th}$ transmission unit, the configuration information comprises first information, the first information is used to indicate a quantity of transmission units located before the $n^{th}$ transmission unit in a feedback window of the $(n+k)^{th}$ transmission unit, the feedback window is a set of all transmission units for which a downlink data channel acknowledgement response needs to be sent on the uplink control channel of the $(n+k)^{th}$ transmission unit, the $n^{th}$ transmission unit is one of all the transmission units, k is an integer, and n is an integer; and a sending unit, configured to send the downlink data channel acknowledgement response of the $n^{th}$ transmission unit on the uplink control channel of the $(n+k)^{th}$ transmission unit based on the configuration information by using the acknowledgement response resource, wherein the acknowledgement response resource is mapped to the uplink control channel of the $(n+k)^{th}$ transmission unit first in ascending order of subcarrier indexes and then in descending order of symbol indexes.

11. The UE according to claim 10, wherein the UE further comprises:

a determining unit, configured to determine the acknowledgement response resource based on the first information.

12. The UE according to claim 11, wherein the configuration information further comprises second information, and the second information is used to indicate a size of the feedback window of the $(n+k)^{th}$ transmission unit; and the determining unit is further configured to determine the acknowledgement response resource based on the first information and the second information.

13. The UE according to claim 10, wherein the receiving unit is specifically configured to receive, by using physical layer signaling, broadcast signaling, or higher layer signaling, the configuration information that is of the acknowledgement response resource and that is sent by a base station.

14. The UE according to claim 10, wherein a ratio of a quantity of uplink transmission units to a quantity of downlink transmission units for the downlink data channel and uplink control channel is not fixed.

* * * * *